US010585678B2

(12) United States Patent
Devta

(10) Patent No.: US 10,585,678 B2
(45) Date of Patent: Mar. 10, 2020

(54) INSERTION OF CUSTOM ACTIVITIES IN AN ORCHESTRATED APPLICATION SUITE

(71) Applicant: Oracle International Corporation, Redwood Shores, CA (US)

(72) Inventor: Prakash Kumar Devta, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 52 days.

(21) Appl. No.: 15/956,777

(22) Filed: Apr. 19, 2018

(65) Prior Publication Data

US 2019/0324763 A1 Oct. 24, 2019

(51) Int. Cl.

| | |
|---|---|
| ***G06F 9/448*** | (2018.01) |
| ***H04L 29/08*** | (2006.01) |
| ***G06F 9/451*** | (2018.01) |
| ***G06F 16/84*** | (2019.01) |

(52) U.S. Cl.

CPC .............. *G06F 9/448* (2018.02); *G06F 9/451* (2018.02); *G06F 16/84* (2019.01); *H04L 67/10* (2013.01)

(58) Field of Classification Search

CPC .......... G06F 9/448; G06F 9/451; G06F 16/84; H04L 67/10

See application file for complete search history.

(56) References Cited

U.S. PATENT DOCUMENTS

| | | | | |
|---|---|---|---|---|
| 6,041,357 | A | 3/2000 | Kunzelman et al. | |
| 7,146,532 | B2 | 12/2006 | McCabe | |
| 7,523,262 | B2 | 4/2009 | Casazza | |
| 7,593,911 | B1 * | 9/2009 | Farah | H04L 63/0263 706/47 |
| 8,756,526 | B2 | 6/2014 | Gador et al. | |
| 8,825,877 | B2 | 9/2014 | Kakadia | |
| 8,909,796 | B2 | 12/2014 | Goff et al. | |
| 9,632,765 | B1 * | 4/2017 | Falcone | G06F 16/1744 |
| 10,346,294 | B2 * | 7/2019 | van Schaik | G06F 11/3692 |
| 10,360,067 | B1 * | 7/2019 | Wagner | G06F 9/4881 |
| 2005/0203975 | A1 * | 9/2005 | Jindal | G06F 8/38 |

(Continued)

OTHER PUBLICATIONS

Understanding ASP.NET View State, https://msdn.microsoft.com/en-us/library/ms972976.aspx, downloaded circa Feb. 28, 2018, pp. 1-23.

Optimize ASP.NET Performance using View State Caching—Ncache, http://www.alachisoft.com/resources/articles/asp-net-performance-view-state-caching.html, downloaded circa Feb. 28, 2018, pp. 1-6.

(Continued)

*Primary Examiner* — Mohamed A. Wasel

(74) *Attorney, Agent, or Firm* — IPHORIZONS PLLC; Narendra Reddy Thappeta

(57) ABSTRACT

An aspect of the present disclosure provides for inserting custom activities in orchestrated application suites. In an embodiment, an element of interest is first identified in a base suite. The scope of the element of interest in the base suite is then determined. A custom activity is inserted after an end of the scope of the element of interest to form a deployment suite corresponding to the base suite. According to another aspect, the base suite comprises a set of applications, wherein the end of scope of the element is determined to be in a first application of the set of applications, wherein a second application of the set of application immediately follows the first application in a processing flow of the base suite. The custom module is placed between the first application and the second application, wherein the custom module when executed performs the custom activity.

20 Claims, 14 Drawing Sheets

(56) References Cited

U.S. PATENT DOCUMENTS

| | | | | |
|---|---|---|---|---|
| 2006/0248199 | A1 | 11/2006 | Stanev | |
| 2007/0276888 | A1 | 11/2007 | Klemm | |
| 2009/0158249 | A1* | 6/2009 | Tomkins | G06F 11/3696 717/107 |
| 2010/0138479 | A1* | 6/2010 | Zhu | G06F 8/60 709/203 |
| 2014/0059703 | A1* | 2/2014 | Hung | G06F 21/53 726/28 |
| 2014/0325499 | A1* | 10/2014 | Jawa | G06F 21/54 717/171 |
| 2015/0317154 | A1* | 11/2015 | Marimuthu | G06F 9/44505 717/122 |
| 2016/0041824 | A1* | 2/2016 | Bostick | G06F 8/75 717/123 |
| 2018/0032314 | A1* | 2/2018 | Gorbaty | G06F 11/36 |

OTHER PUBLICATIONS

Pascal Kolb, Realization of EAI Patterns with Apache Camel, https://pdfs.semanticscholar.org/0969/a5a080c1ea379d11abce69a3b52286130cc3.pdf, downloaded circa Feb. 26, 2018, pp. 1-69.

Messaging Patterns in Service Oriented Architecture, https://msdn.microsoft.com/en-us/library/aa480061(d=printer).aspx, downloaded circa Feb. 26, 2018, pp. 1-8.

Handling Large Messages Using Claim Check Pattern _ SAP NetWeaver 7.4, https://help.sap.com/viewer/3cbd9bae5d3e45ab99e968e0c879beb4/7.4.19/en-US/7f984c062f3a4579b97602e48fd17cc8.html, downloaded circa Feb. 27, 2018, pp. 1-3.

* cited by examiner

```
<ns0:icsproject ... name="project_1" version="7.2" modelType="freeform">
    <ns0:icsflow name="flow_1">
    ...
```

410

```
      <application name="application_24">
        <role>target</role>
        <adapter>
          <type>app-adapter</type>
          <code>FTP</code>
          <name>writeFile</name>
          <property name="hasAttachment" value="false" />
        </adapter>
    ...
      </application>
    ....
```

420

```
      <processor name="processor_34">
        <type>transformer</type>
        <role>transformer:response-map</role>
        <resourceGroup name="resourcegroup_37">
```

425 →

```
          <resource name="resource_38" location="../resources/processor_34/resourcegroup_37/req_68653710b28b4bc28c62dd46b1ba8953.xsl" type="xslt" />
        </resourceGroup>
    ....
       </processor>
    ....
```

430

```
      <orchestration>
        <receive id="r0" refUri="application_8/outbound_9/output_16" />
        <transformer id="m1" refUri="processor_34" />
        <invoke id="i0" refUri="application_24" />
        <transformer id="m2" refUri="processor_51" />
        <invoke id="i1" refUri="application_39" />
        <transformer id="m3" refUri="processor_68" />
        <invoke id="i2" refUri="application_56" />
        <transformer id="m0" refUri="processor_19" />
        <reply id="y0" refUri="application_8/outbound_9/input_14" />
      </orchestration>
  </ns0:icsflow>
</ns0:icsproject>
```

*FIG. 4*

```
     <xsl:template match="/" xml:id="id_11">
       <nstrgmpr:WriteFile xml:id="id_12">
         <nstrgmpr:OutboundFTPHeaderType xml:id="id_19">
           <nsmpr3:fileName xml:id="id_20">
515          <xsl:value-of select="/nssrcmpr:execute/nssrcmpr:attachments/
     nsmpr2:attachment/nsmpr2:attachmentProperties/nsmpr2:partName" xml:id="id_21" />
           </nsmpr3:fileName>
         </nstrgmpr:OutboundFTPHeaderType>
         <nsmpr1:ICSFile xml:id="id_16">
510        <nsmpr1:FileReference xml:id="id_17">
             <xsl:value-of select="/nssrcmpr:execute/nssrcmpr:attachments/
520  nsmpr2:attachment/nsmpr2:attachmentReference" xml:id="id_18" />
           </nsmpr1:FileReference>
           <nsmpr1:Properties xml:id="id_22">
             <nsmpr1:filename xml:id="id_23">
               <xsl:value-of select="/nssrcmpr:execute/nssrcmpr:attachments/
     nsmpr2:attachment/nsmpr2:attachmentProperties/nsmpr2:partName" xml:id="id_24" />
             </nsmpr1:filename>
           </nsmpr1:Properties>
         </nsmpr1:ICSFile>
       </nstrgmpr:WriteFile>
     </xsl:template>
     ...
     <xsl:template match="/" xml:id="id_11">
       <nstrgmpr:execute xml:id="id_12">
             <nsmpr3:request-wrapper xml:id="id_21">
           <nsmpr3:test xml:id="id_22">
530 535      <xsl:value-of select="$writeFile/nsmpr1:WriteFileResponse/
     nsmpr1:FTPWriteResponse/nsmpr2:Status" xml:id="id_23"/>
           </nsmpr3:test>
         </nsmpr3:request-wrapper>
       </nstrgmpr:execute>
     </xsl:template>
     </xsl:stylesheet>
     ...
     <xsl:template match="/" xml:id="id_11">
       <nstrgmpr:execute xml:id="id_12">
             <nsmpr5:request-wrapper xml:id="id_26">
           <nsmpr5:t xml:id="id_27">
540          <xsl:value-of select="/nssrcmpr:execute/nssrcmpr:attachments/
545  nsmpr7:attachment/nsmpr7:attachmentReference" xml:id="id_28"/>
           </nsmpr5:t>
         </nsmpr5:request-wrapper>
       </nstrgmpr:execute>
     </xsl:template>
```

*FIG. 5*

INSERTION OF CUSTOM ACTIVITIES IN AN ORCHESTRATED APPLICATION SUITE

BACKGROUND OF THE DISCLOSURE

Technical Field

The present disclosure relates to orchestration of application suites, and more specifically to inserting custom activities in an orchestrated application suite.

Related Art

An application suite refers to a collection of applications, which together implement a desired processing flow as is well known in the relevant arts. Each application is designed as a set of modules that are executed together independent of other applications to provide a corresponding set of utilities. The processing flow in turn specifies the order in which a request is processed by different applications of the suite.

Orchestration refers to specifying the applications and their relative positions in the desired processing flow. A respective mapping may also be specified for each application to provide any required transformation and mapping of data elements present earlier in the processing flow to those in input data of the corresponding application. The applications and any mappers together thus specified form an orchestrated application suite.

The inventor has recognized a need for insertion of custom activities in an orchestrated application suite. In general, an application suite is functional for the broad general purpose it is designed for, even in the absence of custom activities. Thus, an orchestrated suite containing custom activities is referred to as a deployment suite, contrasted with a base suite (of orchestrated application suite) which does not contain such custom activities.

Aspects of the present disclosure are directed to inserting custom activities in an orchestrated application suite.

BRIEF DESCRIPTION OF THE DRAWINGS

Example embodiments of the present disclosure will be described with reference to the accompanying drawings briefly described below.

FIG. 4 depicts a portion of orchestration data specifying the applications and locations where input-output relationship is specified between applications in an embodiment.

FIG. 5 depicts a further portion of the orchestration data specifying the input-output relationship between applications.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure provides for inserting custom activities in orchestrated application suites. In an embodiment, an element of interest is first identified in a base suite. The scope of the element of interest in the base suite is then determined. A custom activity is inserted after an end of the scope of the element of interest to form a deployment suite corresponding to the base suite.

According to another aspect, the base suite comprises a set of applications, wherein the end of scope of the element is determined to be in a first application of the set of applications, wherein a second application of the set of application immediately follows the first application in a processing flow of the base suite. The custom module is placed between the first application and the second application, wherein the custom module when executed performs the custom activity.

In an embodiment, a first orchestration data specifies an invocation contract at an entry application in the processing flow, and also the set of applications and a set of mappers in the base suites. Each mapper of the set of mappers is associated with an immediately following application of the set of applications according to the processing flow, wherein the mapper maps elements of the invocation contract or earlier applications in the processing flow to an input data of the associated application. Thus, determination of the scope may entail examining the first orchestration data to identify a last application in each flow of the processing flow where the element of interest is used.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
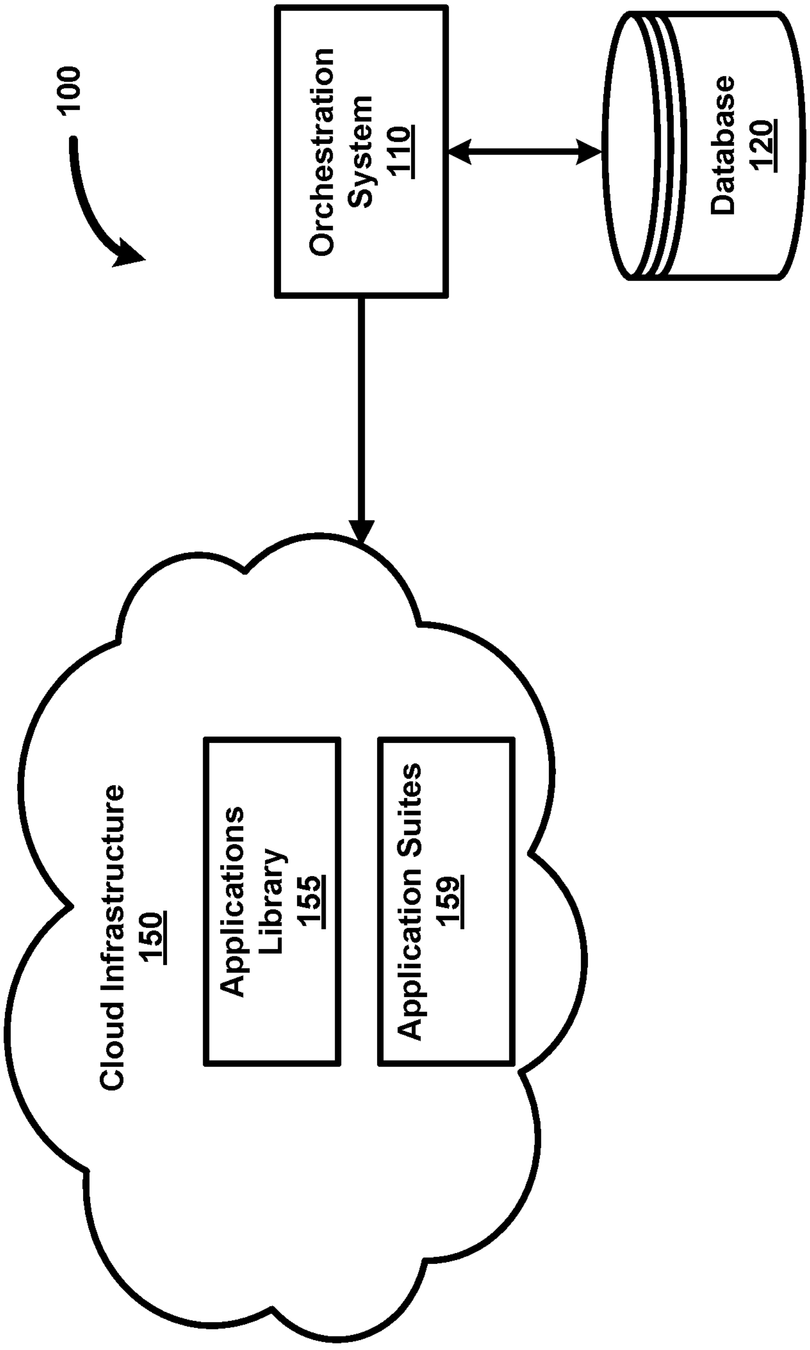
FIG. 1 is a block diagram illustrating an example environment in which several aspects of the present disclosure can be implemented.

FIG. 1 is a block diagram illustrating an example environment in which several aspects of the present disclosure can be implemented. The block diagram is shown containing orchestration system 110, database 120 and cloud infrastructure 150. The block diagram is shown with a representative set of components merely for illustration, though typical environments employing aspects of the present disclosure can have many more types and number of systems.

Cloud infrastructure 150 is shown containing applications library 155 and application suites 159. Applications library 155 contains the set of applications available for building various application suites, as desired by the customers. Application suites 159 represent suites tailored for individual customers. Application suites 159 may contain various base suites, some of which may be further modified in accordance with aspects of the present disclosure to form corresponding deployment suites, which are also considered part of application suites 159.

Cloud infrastructure 150 provides for execution of each application suite. Accordingly cloud infrastructure 150 contains hardware elements such as digital processing systems, switches, databases, electrical equipment, etc., to support execution of the application suites and the corresponding processing flows. It should be appreciated that though applications library and application suites are shown within cloud infrastructure, these entities may be provided external to cloud infrastructure 150.

Database 120 may be used as an intermediate repository while orchestrating deployment suites or base suites according to aspects of the present disclosure. Database 120 can be part of cloud infrastructure 150 also.

Orchestration system 110 facilitates generation of deployment suites in addition to definition of base suites. Various user interfaces may be provided for definition of base suites, as will be apparent to a skilled practitioner. Aspects of the present disclosure provide for insertion of custom activities into such base suites, as described below with examples. The description is continued with respect to example base suites for illustration.

3. Example Base Suites

Figure 2A:
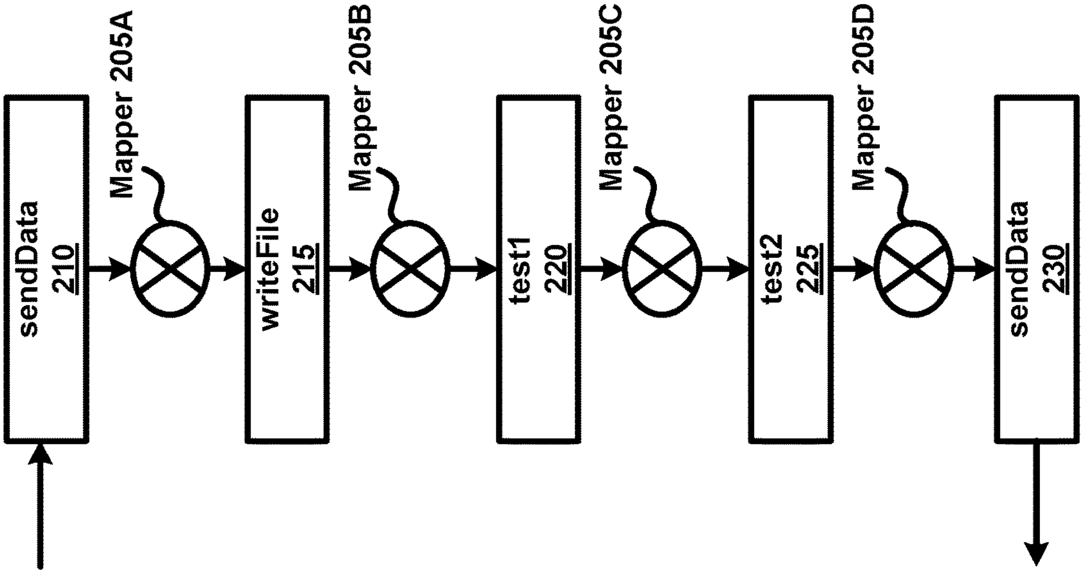
FIG. 2A depicts a base suite with a linear processing flow in an embodiment.
Figure 2B:
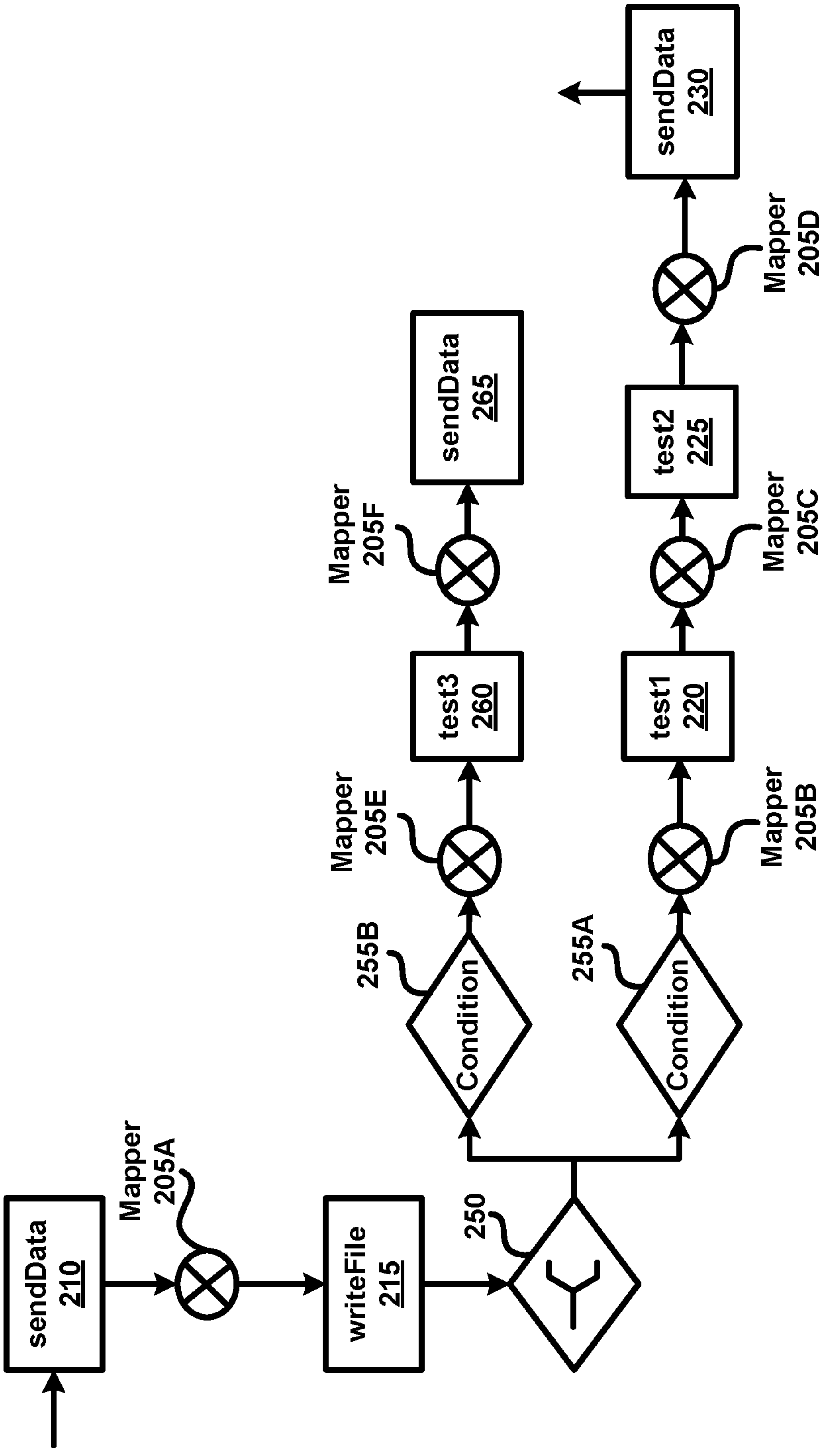
FIG. 2B depicts a base suite with conditional processing flow in an embodiment.

FIGS. 2A and 2B illustrate the applications in respective example base suites. FIG. 2A illustrates a base suite with a linear processing flow while FIG. 2B illustrates a base suite with a conditional processing flow. A processing flow is said to be a linear processing flow when all the applications in the base suite form a part of the processing flow and are executed sequentially when processing transactions. A processing flow is said to be conditional when the set of applications of a base suite to process a transaction is determined based on the satisfaction of a specific condition. The description of the base suites with linear and conditional processing flows is continued below with respect to FIGS. 2A and 2B respectively.

FIG. 2A is shown containing applications sendData 210, writeFile 215, test1 220, test2 225 and sendData 230, and mappers/transformers 205A-205D in a base suite. Each of the applications and mappers may be implemented as corresponding set of execution blocks, which can be executed in cloud infrastructure 150. The linear processing flow of FIG. 2A is shown with a representative set of applications and mappers merely for illustration, though typical linear processing flows employing the aspects of the present disclosure can have many more applications and mappers.

Applications sendData 210, writeFile 215, test1 220, test2 225 and sendData 230 in the base suite are directed to performing various tests on a server system. Application sendData 210 receives input data from an external system. Application writeFile 215 writes the received data into a file through file Transfer Protocol (FTP). Applications test1 220 and test2 225 perform various test operations on a remote system (i.e., Google server as indicated in Appendix-A) based on the data received and written into the file. Application sendData 230 sends the results to the external system or any other system. However the features of the present disclosure can be implemented in the context of various other applications, as will be apparent to a skilled practitioner.

Each application processes the corresponding input data (part of payload of a received packet) to generate corresponding output data (provided as payload of a corresponding packet). The depicted processing flow specifies the order in which applications process each request received according to an invocation contract by the first application (210) in the processing flow. Each application may be implemented with a corresponding set of adapters to communicate with external applications (not shown).

Mappers 205A-205D (or transformers) map (or transform) output elements of earlier applications (including those received per invocation by entry application 210) to input elements of later applications in the processing flow. In the example embodiment shown, each mapper is shown associated with an immediately following application in the processing flow. Thus, input elements of the entry application (210) or those generated by earlier applications can be directly mapped to the input elements of a later application in the processing flow. For example, input elements of application sendData 210, and those generated by writeFile 215 can be provided as an input to test1 220.

Mappers 205A-205D may perform the mapping using mapping/transformation data. Mapping data can be generated based on user/designer inputs specifying the mappings between the elements of different applications. Mapping data may be stored in any suitable format as will be apparent to a skilled practitioner. In an example embodiment, the transformation data is stored in eXtensible Stylesheet Language Transformations (XSLT) format.

FIG. 2B is shown containing applications sendData 210, writeFile 215, test1 220, test2 225, sendData 230, test3 260 and sendData 265, conditional flow indicator 250, condition blocks 255A and 255B, and mappers 205A-205F in another base suite while employing some of the applications already shown in FIG. 2A. The conditional processing flow of FIG. 2B is shown with a representative set of applications, mappers, conditional flow indicator and condition blocks merely for illustration, though typical conditional linear processing flows employing the aspects of the present disclosure can have many more applications, mappers, conditional flow indicators and condition blocks.

Applications and mappers of FIG. 2B are similar to the applications and mappers described above with respect to FIG. 2A. Conditional flow indicator 250 indicates the presence of conditional flow paths in the processing flow of the base suite. Condition blocks 255A and 255B evaluate whether corresponding conditions are satisfied or not. Applications test1 220, test2 225 and sendData 230 form a part of the processing flow only if the condition in condition block 255A is satisfied. Applications test3 260 and sendData 265 form a part of the processing flow only if the condition in condition block 255B is satisfied. Though shown as separate blocks in FIG. 2B, in alternative embodiments, conditional flow indicator 250 and condition blocks 255A and 255B can be a part of an immediately preceding application in the processing flow. Furthermore, though not shown in FIG. 2B, the conditional flow paths may merge at a later stage forming a single flow.

Furthermore, a base suite may also have a parallel processing flow where some of the applications of the processing flow are executed in parallel. Aspects of the present disclosure can also be implemented in such base suites having parallel processing flows.

The description is continued with respect to inserting custom activity in the processing flow of the base suites.

4. Insertion of Custom Activities

Figure 3:
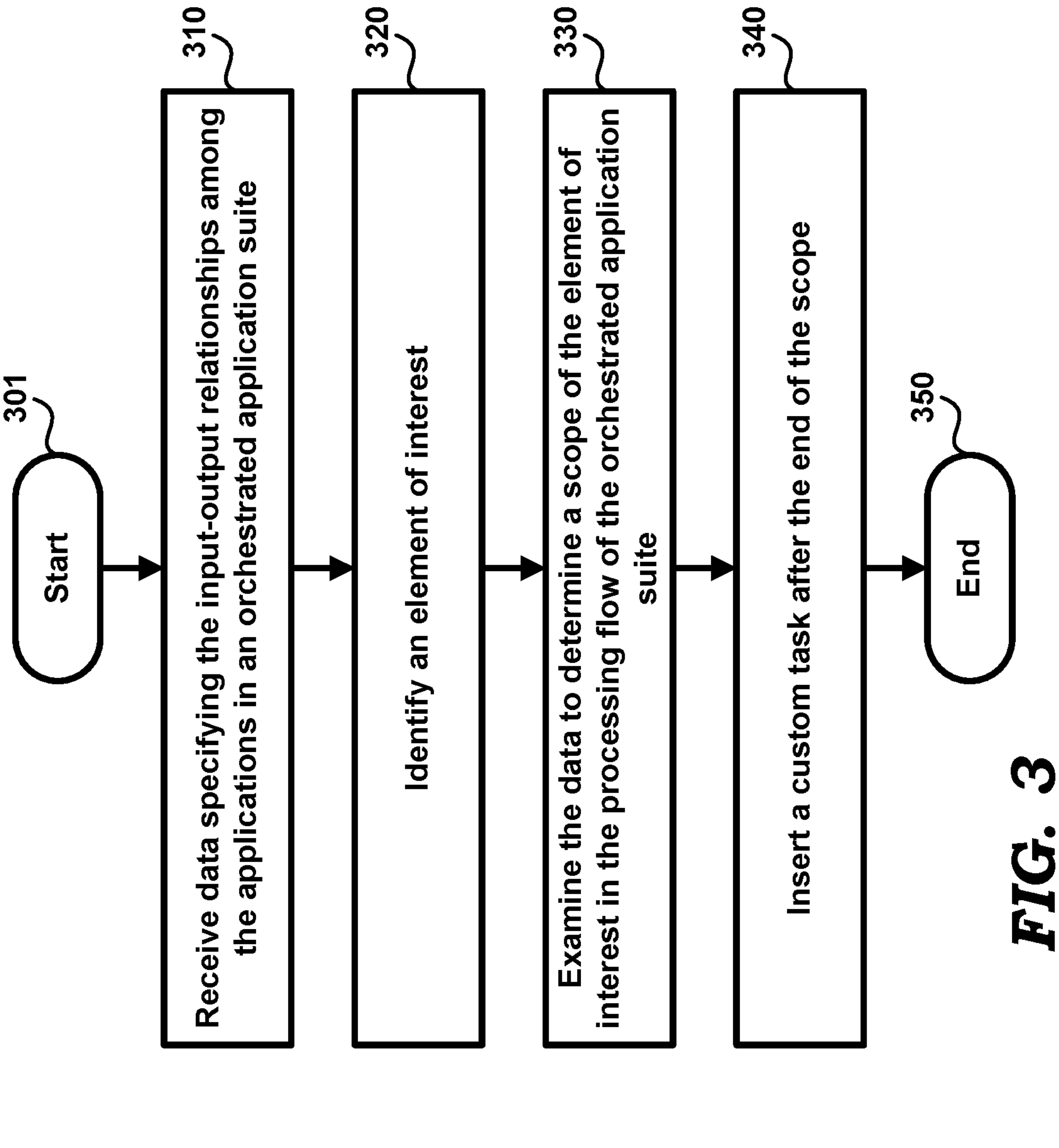
FIG. 3 is a flow chart illustrating the manner in which custom activities are inserted in an orchestrated application suite according to an aspect of the present disclosure.

FIG. 3 is a flow chart illustrating the manner in which custom activities are inserted in an orchestrated application suite according to an aspect of the present disclosure. Merely for illustration it is assumed that a base suite is first present before insertion of the custom activities. However, alternative approaches can insert custom activities at different phases of design suited in the corresponding environments, as will be apparent to one skilled in the relevant arts by reading the disclosure herein. In addition, the features of FIG. 3 are described with respect to FIG. 1, and the insertion is described as being performed in orchestration system 110 also merely for illustration, even though the insertion can be performed in other environments and systems as will be apparent to a skilled practitioner. The flow chart begins in step 301, in which control immediately passes to step 310.

In step 310, orchestration system 110 receives data specifying the input-output relationships among the applications in the base suite. In case of entry applications in the processing flow (i.e., sendData 210 of FIGS. 2A and 2B), the data specifies the input details of a contract using which the corresponding entry application operates. For all later applications in the application flow, the data specifies the correspondence of the output element of an earlier application with the input element of a later application according to the processing flow. The data can be in any format as will be apparent to a skilled practitioner.

In step 320, orchestration system 110 identifies an element of interest in the base suite. An element can be a part of a request payload (including that received by the first application in the flow of orchestrated suite) or a response payload (including that generated by the last application in the flow of orchestrated suite), or a variable created in the processing flow. For example, an element of interest can be a reference to a file. In an example embodiment, orchestration system 110 identifies the element of interest based on the input received via a user interface, even though the element can be determined based on other considerations as well.

In step 330, orchestration system 110 examines the data specifying the input-output relationships among the applications in the base suite to determine the end of the scope of the element of interest in the processing flow of the base suite. Scope of an element represents the specific applications in which the corresponding element is used. The end of such scope in the processing flow implies the last of such applications in the processing flow beyond which the element (including its mapped equivalent) is not used (as providing input for other operations or as being set to a new value). Orchestration system 110 may use parsing techniques known in the relevant arts for determining the scope of the element of interest in the processing flow.

In step 340, orchestration system 110 inserts a custom activity after the end of the scope of the element of interest. In an example embodiment described below, custom activity includes sending a notification to the user, logging an event, taking backup or removing or archiving the element of interest (such as a file). The flowchart ends in step 350.

Thus aspects of the present disclosure provide for insertion of custom activities into base suites. The features described above can be implemented in the context of various environments. The description is continued with respect to examples for illustration.

5. Example Implementation for Determining the Scope of an Element of Interest FIG. 4 depicts a portion of orchestration data in eXtensible Markup Language (XML) format specifying the applications and locations where input-output relationship is specified between applications, for the base suite of FIG. 2A. Additional detail of the orchestration data for the base suite of FIG. 2A is shown in Appendix-A. Though the orchestration data of FIG. 4 and Appendix-A is in XML format, the orchestration data can also be in other formats as will be apparent to a skilled practitioner.

FIG. 4 is shown containing sections 410, 420 and 430. Section 410 indicates the portion of the data corresponding to application writeFile 215 (application_24). Section 420 indicates the portion of the data corresponding to mapper 205A (processor_34). Section 430 indicates the order (relative positions) of the applications and the mappers in the base suite of FIG. 2A.

As may be observed from section 410, section 410 indicates the portion of the data corresponding to application writeFile 215 (application_24). Appendix-A contains the data corresponding to all the applications in the base suite of FIG. 2A.

Section 420 indicates the portion of the data corresponding to mapper 205A (processor_34).

Mapper 205A maps the output elements of sendData 210 or those in invocation contract to the input elements of writeFile 215. Mapper 205A performs the mapping, for example, based on the mappings specified by a user/designer that is stored in XSLT format at the location specified in element 425. Similarly, the mapping data corresponding to each of the other mappers of the base suite FIG. 2A is also stored in XSLT format. The mapping data corresponding to each mapper may be stored in a different file and at a different location.

Section 430 indicates the order (relative positions) of the applications and the mappers in the base suite of FIG. 2A. As may be observed from section 430, mapper 205A (processor_34) is immediately followed by application writeFile 215 (application_24), indicating that mapper 205A maps the output elements of application sendData 210 or those in invocation contract to the input elements of application writeFile 215.

As may be observed from the more detailed orchestration data in Appendix-A also, in case of entry application sendData 210, the orchestration data specifies the input details of the contract using which application sendData 210 operates. For the subsequent applications writeFile 215, test1 220, test2 225 and sendData 230 in the base suite, the mapping data in XSLT format (stored at the locations indicated in the XML data of Appendix-A) specifies the correspondence of the output elements of the earlier applications (including those received per invocation by entry application 210) with the input elements of the later applications according to the processing flow.

Mapping data corresponding to the mappers 205A, 205B and 205C of FIG. 2A, stored at the locations (for example, element 425) indicated in the XML data of Appendix-A, is shown in Appendix-B. Mapping data is also a part of the orchestration data. Relevant portions of Appendix-B corresponding to mappers 205A, 205B and 205C are shown in FIG. 5 for illustration.

FIG. 5 is shown containing sections 510, 530 and 540. Though shown in one Figure, sections 510, 530 and 540 may correspond to the mapping data stored in three different XSLT files at three different locations.

Section 510 depicts the mapping data corresponding to mapper 205A. Sub-section 515 indicates that element 'partName' from an earlier application is mapped to element 'fileName' in application writeFile 215. Sub-section 520 indicates that element 'attachmentReference' from an earlier application is mapped to element 'FileReference' in application writeFile 215.

Section 530 depicts the mapping data corresponding to mapper 205B. Sub-section 535 indicates that element 'Status' from an earlier application is mapped to element 'test' in application test1 220.

Section 540 depicts the mapping data corresponding to mapper 205C. Sub-section 545 indicates that element 'attachmentReference' from an earlier application is mapped to element 't' in application test2 225.

The manner in which orchestration system 110 determines the end of the scope of an element of interest is described below assuming element 'attachmentReference' noted above as the element of interest. In general, an element of interest can be any namespace qualified XML element in request or response message in the exemplary XML messaging based orchestration approach described herein.

Orchestration system 110, upon identifying 'attachmentReference' as the element of interest, parses through the data in section 430 and identifies mapper 205A as the first mapper in the processing flow. Orchestration system 110 then parses through section 420 and identifies the location (sub-section 425) where the mapping data corresponding to mapper 205A is stored in XSLT format.

Thereafter, orchestration system 110 parses through the mapping data corresponding to mapper 205A (i.e., section 510) and identifies that the element of interest 'attachmentReference' is mapped to element 'FileReference' in application writeFile 520 thereby identifying the usage of the element of interest in application writeFile 215. In an example embodiment, parsing for the element of interest in the mapping data (XSLT data) includes comparing the XPath expression of the element of interest with the XPath expressions of the elements of target application (i.e., elements of application writeFile 520).

Orchestration system 110 continues the above process and parses through the corresponding mapping data (in XSLT file) of mappers 205B-205D to identify the usage of the element of interest 'attachmentReference' (or its mapped equivalent 'FileReference') in the applications test1 220, test2 225 and sendData 230 respectively. Though mapping data corresponding to mapper 205D is not shown in FIG. 5 or Appendix-B, orchestration system 110 also parses through the mapping data corresponding to mapper 205D. Upon parsing through the mapping data of corresponding to all the mappers, orchestration system 110 identifies that the element of interest 'attachmentReference' (or its mapped equivalent) is not used after application test2 225, thereby determining that the scope of the element of interest 'attachmentReference' ends after application test2 225. Thus, orchestration system 110 determines the end of the scope of the element of interest by parsing through the data in Appendices A and B.

Though described with respect to the linear processing flow of the base suite of FIG. 2A, above process is applicable to the conditional processing flow of the base suite of FIG. 2B also. A portion of the orchestration data for the base suite of FIG. 2B is shown in Appendix-C.

The description is continued below with respect to example deployment suites containing custom modules inserted after the end of the scope of the element of interest.

6. Example Deployment Suites with Custom Modules

Figure 6A:
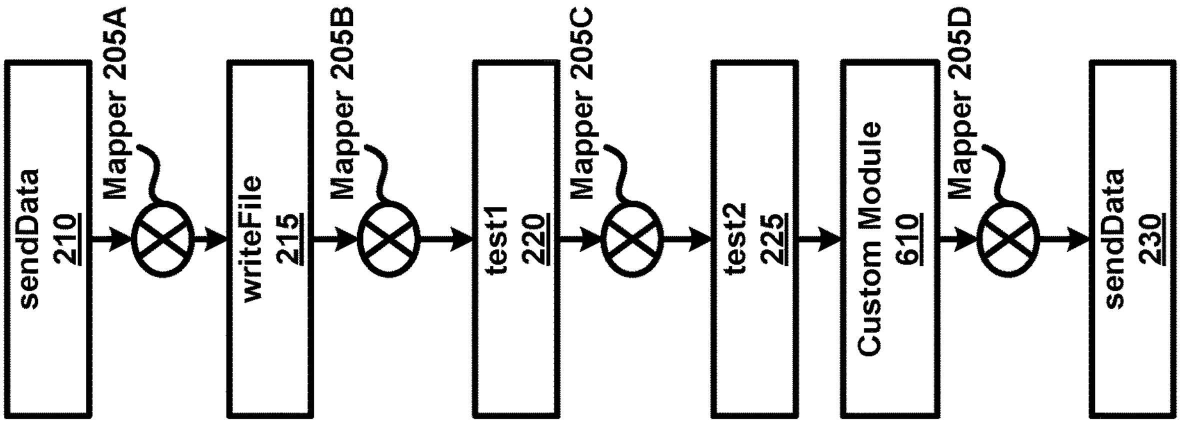
FIG. 6A depicts a deployment suite upon insertion of a custom activity in the base suite of FIG. 2A.
Figure 6B:
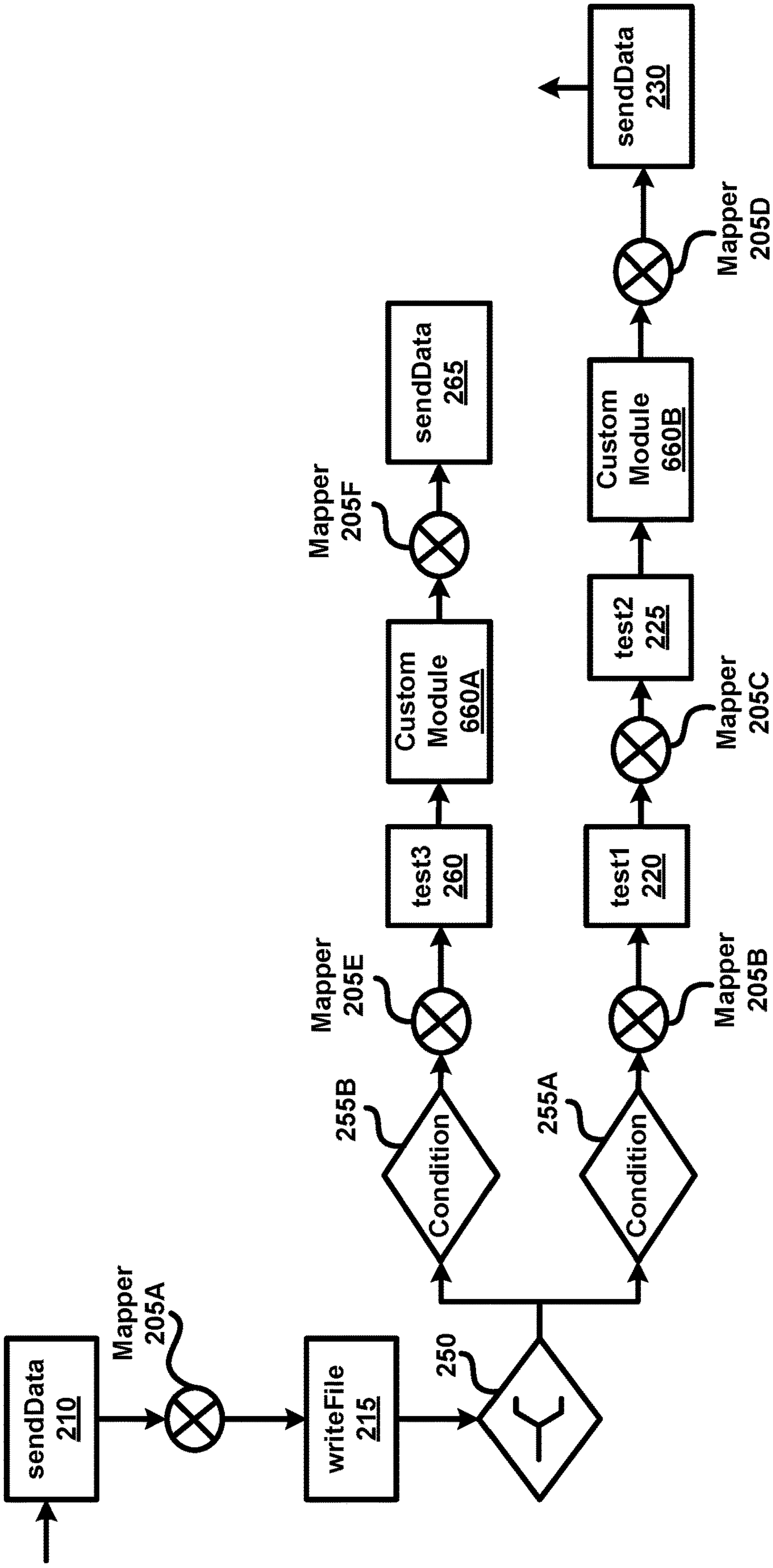
FIG. 6B depicts a deployment suite upon insertion of custom activities in the base suite of FIG. 2B.

FIGS. 6A and 6B depict deployment suites upon insertion of custom modules in the base suites of FIGS. 2A and 2B respectively. A base suite is transformed to a deployment suite upon insertion of custom module(s).

Orchestration system 110 upon determining the end of the scope of the element of interest, inserts custom module(s) into the base suites thereby transforming the base suites into deployment suites.

Accordingly, FIG. 6A is shown containing custom module 610 inserted after application test2 225 as the scope of the element of interest "attachmentReference" ends at the end of application test2 225. Custom module 610 implements custom activity(s) during the execution of the deployment suite.

In FIG. 6B, applications test1 220, test2 225 and sendData 230 form a part of the processing flow only if the condition in condition block 255A is satisfied. Similarly, Applications test3 260 and sendData 265 form a part of the processing flow only if the condition in condition block 255B is satisfied. Thus, there are two possible processing flows after conditional flow indicator 250. Accordingly, it may be possible that the element of interest has two different scopes depending on which conditional flow path forms the part of the processing flow after conditional flow indicator 250.

FIG. 6B is shown containing custom modules 660A and 660B inserted after applications test2 225 and test3 260 respectively, with the assumption that the scope of the element of interest ends at the end of applications test3 test2 225 and test3 260 in respective conditional flow path.

In case the scope of the element of interest ends before conditional flow indicator 250, then the element of interest will have only one scope and the custom module is inserted accordingly. Also, in cases where the conditional flow paths merge at a later point forming a single path and where the element of interest is used even after the merging point, the element of interest will have only one scope.

During the execution (run time) of deployment suites, custom modules in the deployment suites also get executed thereby implementing the corresponding custom activities. Example custom activities include sending notifications to the users, logging events, taking backup or removing or archiving the element of interest (where the element of interest is a file) after the end of the scope of the element of interest.

It may be readily appreciated that additional custom modules may be inserted into the base suites corresponding to additional elements of interest. The description is continued below with respect to a use case for the aspects of the present disclosure.

7. Example Use Case

Figure 7A:
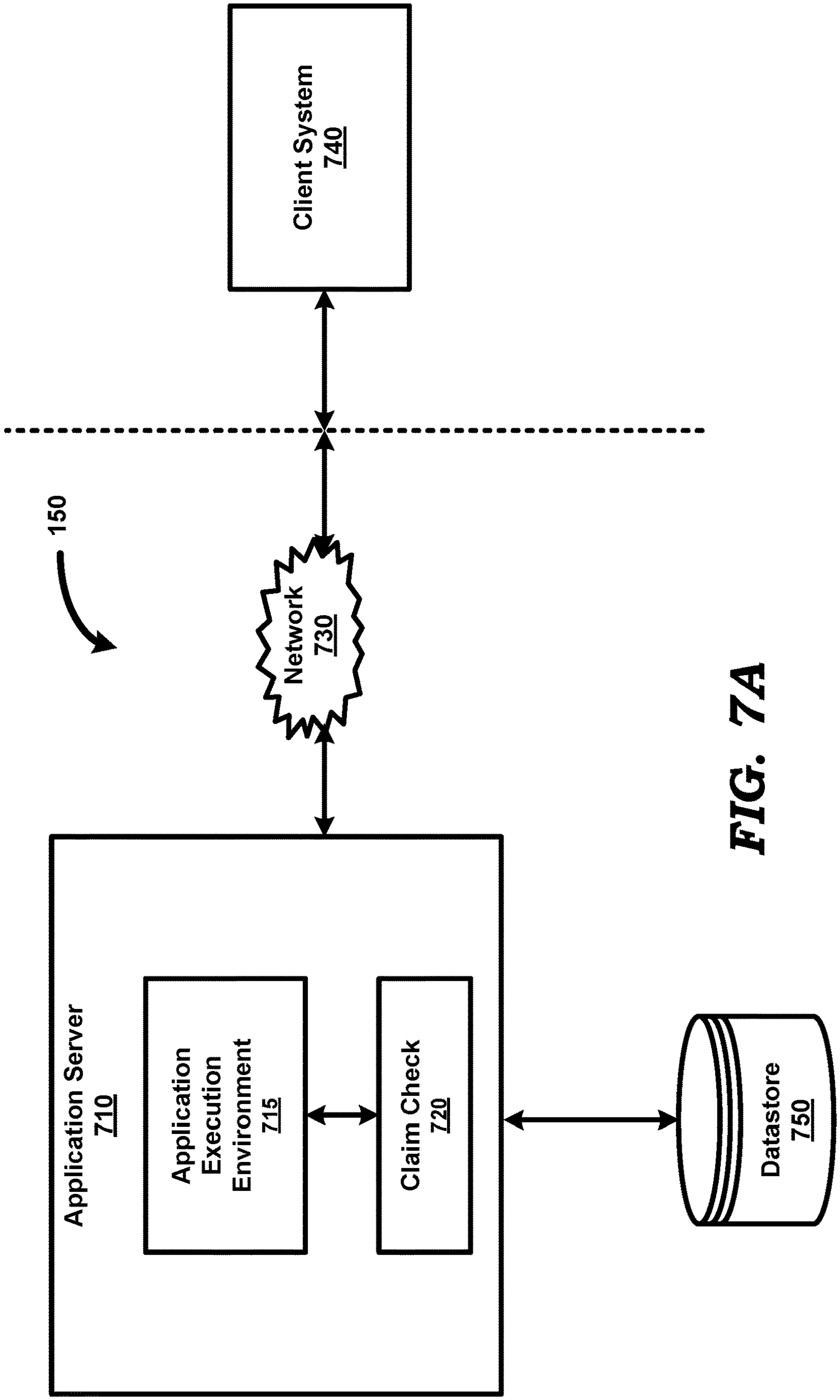
FIG. 7A is a block diagram illustrating a use case for aspects of the present disclosure.

FIG. 7A is a block diagram illustrating a use case for aspects of the present disclosure. FIG. 7 is shown containing application server 710, datastore 750, network 730 and client system 740. Application server 710 is further shown containing application execution environment (AEE) 715 and claim check block 720. Application server 710, datastore 750, network 730 can be a part of cloud infrastructure 150.

Application server 710 provides for the execution of the applications in application suites 159 through AEE 715. Though not shown, application server 710 may also contain runtime libraries, database/datastore connectors, administrative programs for managing the execution of the applications etc. Application server 710 interacts with client system 740 through AEE 715.

AEE 715 executes the applications in application suite 159. AEE 715 acts as an interface between the applications in the application suite 159 as well as between the applications in the application suite 159 and client system 740. AEE 715 receives service requests (messages) from client system 740 and forwards the service requests to respective applications in application suite 159. AEE also forwards the responses from applications in application suite 159 to client system 740. AEE 715 also maintains context information (i.e., application suite variables, elements of requests/responses of individual applications, communications with external systems, etc.) and makes such context information available to individual applications/mappers of the application suite.

Claim check block 770 provides for the operation of claim check process well known in the relevant arts. As part of the claim check process, claim check block 770 receives (check-in) data/files from applications in application suite 159, stores the received data/files in datastore 750 and provides unique identifiers/keys that identify the corresponding data/files to the applications that check-in the data/files. Claim check block 770 provides access (claim) to the data/files stored in datastore 750 to those applications that request access (claim) by sending corresponding unique identifier. Claim check block 720 may also maintain a table (claim check table) that contains the details of the files checked in such as the unique identifiers that identify corresponding files, locations where the corresponding files are stored in datastore 750 etc.

Client system 740 can be any digital processing system such as a terminal, personal computer, workstation, mobile device, computing tablet, etc. Client system 740 is configured to send service requests (messages) to application server 710 and receive responses/messages from application server 710.

Network 730 represents a network providing connectivity between application server 710 and client system 740. Communication network 125 may be an internet (including the world-wide connected Internet), a combination of internet and intranet, etc. Communication network 125 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by communication network 125. When the packet contains content such as port numbers, which specifies a target application, the packet may be said to be directed to such application as well.

Datastore 750 may be used as a repository to store the data/files received from claim check block 770. Datastore 750 may also be used to store other data/files that are used in applications of application suite 159.

Figure 7B:
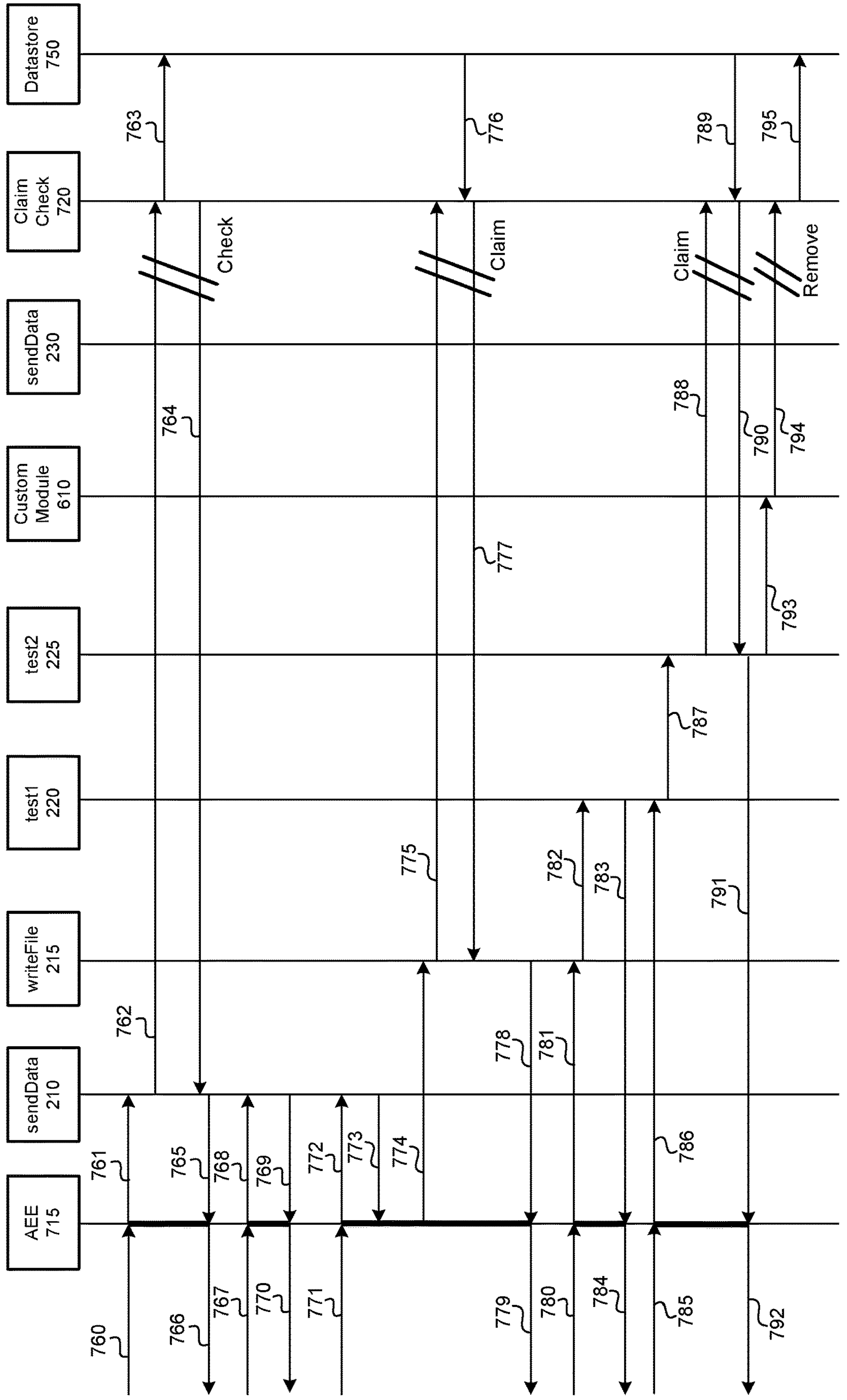
FIG. 7B depicts events at each stage of execution of the deployment suite of FIG. 6A.

FIG. 7B depicts events at each stage of execution of the deployment suite of FIG. 6A in the environment of FIG. 7A.

At 760, AEE 715 of application server 710 receives from client system 740, a service request (a message) along with a file as an attachment. At 761, AEE 715 forwards the service request along with the attachment to application sendData 210. Application sendData 210 determines that the service request has an attachment and at 762, sends the attachment to claim check block 720. At claim 763, claim check block 720 stores the attachment in datastore 750, assigns a unique identifier for the attachment, and makes an entry for the attachment in the claim check table. The entry contains the details of the unique identifier and the location where the attachment identified by the unique identifier is stored in datastore 750. At 764, claim check block 720 sends the unique identifier/key that identifies the attachment stored in datastore 750 to application sendData 210. At 765, claim check block 720 sends a response (along with unique identifier) to the service request to AEE 715. At 766, AEE 715 forwards the response to client system 740.

At 767, AEE 715 receives another service request/message along with the unique identifier from client system 740. At 768, AEE 715 forwards the request to application sendData 210. Application sendData 210 determines that the service request can be processed without having the necessity to use/access the attachment stored at datastore (at 763), and accordingly processes the service request and at 769, sends a response to AEE 715 which then forwards the response to client system 740 at 770. The response also contains the unique identifier.

At 771, AEE 715 receives one more service request from client 740. The service request also contains the unique identifier. At 772, AEE 715 forwards the service request to application sendData 210. Application sendData 210 determines that the service request needs to be processed by next application, i.e., application writeFile 215 and accordingly, at 773, intimates AEE 715 that the service request needs be processed by application writeFile 215. At 774, AEE 715 forwards the service request to application writeFile 215. Upon receiving the service request, application writeFile 215 identifies that the attachment stored in datastore 750 needs to be used/accessed to process the service request. At 775, application writeFile 215 claims the attachment by sending the unique identifier to claim check block 720. At 776 and 777, claim check block 720, provides access to the attachment. Application writeFile 215 processes the service request by accessing/using the attachment and at 778 sends a response to AEE 715. The response also contains the unique identifier. At 779, AEE 715 forwards the response to client system 740.

At 780, AEE 715 receives another service request from client system 740. The service request contains the unique identifier. At 781, AEE 715 forwards the service request to application writeFile 215. Application writeFile 715 determines that the service request needs to be processed by application test1 220. At 782, application writeFile 215 forwards the service request to application test1 220 via AEE 715. Application test1 220 processes the service request without having the necessity to access/use the attachment stored in datastore 750 and at 783, sends a response to AEE 715. The response also contains the unique identifier. At 784, AEE 715 forwards the response to client system 740.

At 785, AEE 715 receives one more service request from client system 740. The service request also contains the unique identifier. At 786, AEE 715 forwards the service request to application test1 220. Application test1 220 determines that the service request needs be processed by application test2 225 and accordingly, at 787, forwards the service request to application test2 225. Upon receiving the service request, application test2 225 determines the necessity of using/accessing the attachment stored in datastore 750. At 788, application test2 225 claims the attachment by sending the unique identifier to claim check block 720. At 789 and 790, application test2 225 uses/accesses the attachment stored in the datastore. Application test2 225 processes the service request and sends a response to AEE 715 at 791. The response also contains the unique identifier. At 792, AEE 715 forwards the response to client system 740. At 793, application test2 225 triggers (via AEE 715) the execution of custom module 610 that performs the custom activity of removing the attachment. Upon execution, custom module 610, at 794, sends a request to claim check block 720 to remove the entry corresponding to the unique identifier in the claim check table. Accordingly, claim check block 720 removes the corresponding entry in the claim check table and at 795, sends an instruction to datastore 750 to overwrite the attachment with some other data/attachment or remove/delete the attachment from datastore 750. Consequently, the unique identifier will also be rendered invalid.

Thus, by removing the files soon after not being required by later applications in the processing flow, the storage space on datastore 750 may be used efficiently. Though FIG. 7B illustrates implementation of the custom activity for removing an attachment (file) stored in datastore 750, the custom activity can also be implemented on a file stored on a database or any memory device.

Furthermore, as may be observed from above, the unique identifier is sent/transmitted between two systems (i.e., between client system 740 and server system 710) and between applications as a part of a stateless architecture. Thus AEE 715 may contain many concurrent servers implementing the applications of the orchestrated suite, and the incoming service requests can be processed by any of the servers, with the unique identifier being used for the needed coordination when information from processing of a prior request (processed by one processor) is required to process another request (processed by another processor).

Though application server 710 is shown as receiving service requests from client system 740 and sending response messages to client system 740, application server 710 may receive service requests from any external system and accordingly may send response messages to the external system. The description is continued below with respect to example User Interfaces for specifying input-output relationships between applications.

8. Example User Interfaces for Specifying Input-Output Relationships Between Applications FIGS. 8A-8C depict the manner in which a user may specify input-output relationships between applications i.e., mapping between the output elements of earlier applications (including those received per invocation by entry application 210) with the input elements of the later applications in a processing flow.

Figure 8A:
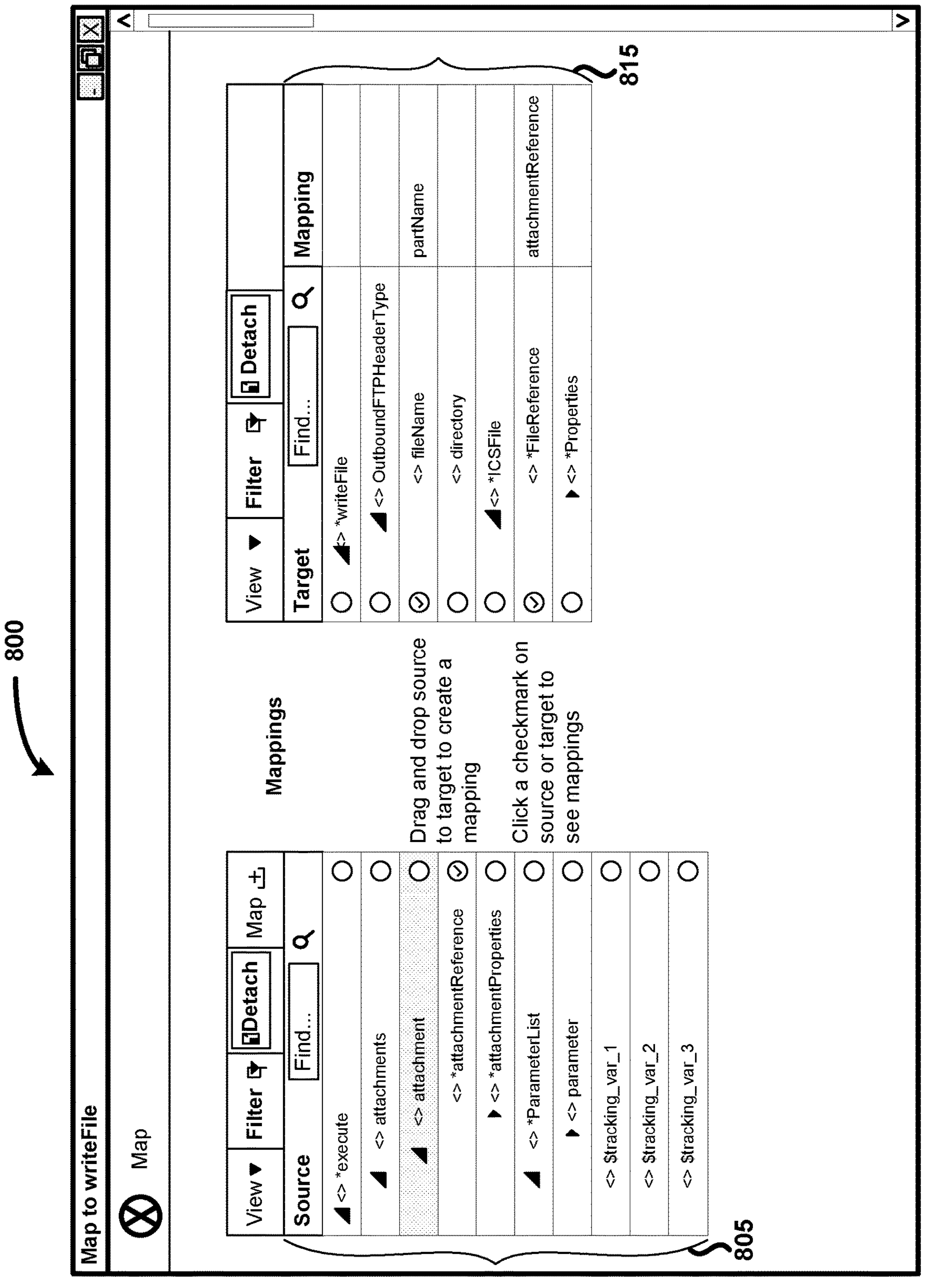
FIG. 8A-8C depict the manner in which a user may specify input-output relationships between applications.

FIG. 8A is a graphical user interface (GUI) 800 illustrating mapping of elements at mapper 205A. GUI 800 is shown containing a list of source elements 805 and a list of target elements 815. GUI 800 illustrates mapping of source elements 'attachmentReference' and 'partName' to target elements 'FileReference' and 'fileName' respectively.

Figure 8B:
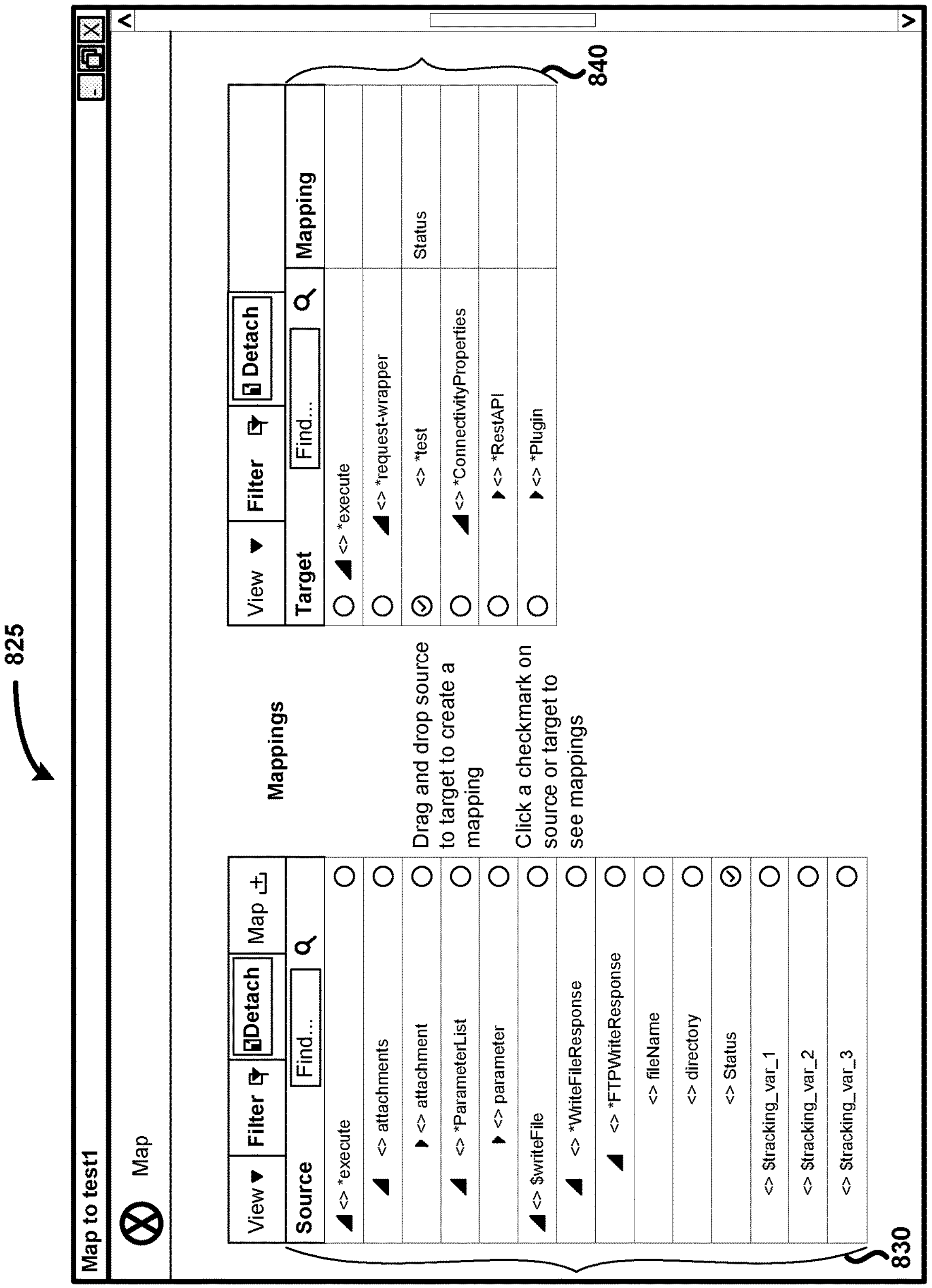

FIG. 8B is a graphical user interface (GUI) 825 illustrating mapping of elements at mapper 205B. As may be observed from FIG. 8B, element 'attachmentReference' (or its mapped equivalent 'FileReference') noted above with respect to FIG. 8A is not mapped to any element in the list of target elements 840 while element 'Status' in the list of source elements 830 is mapped to element 'test' in the list of target elements 840.

Figure 8C:
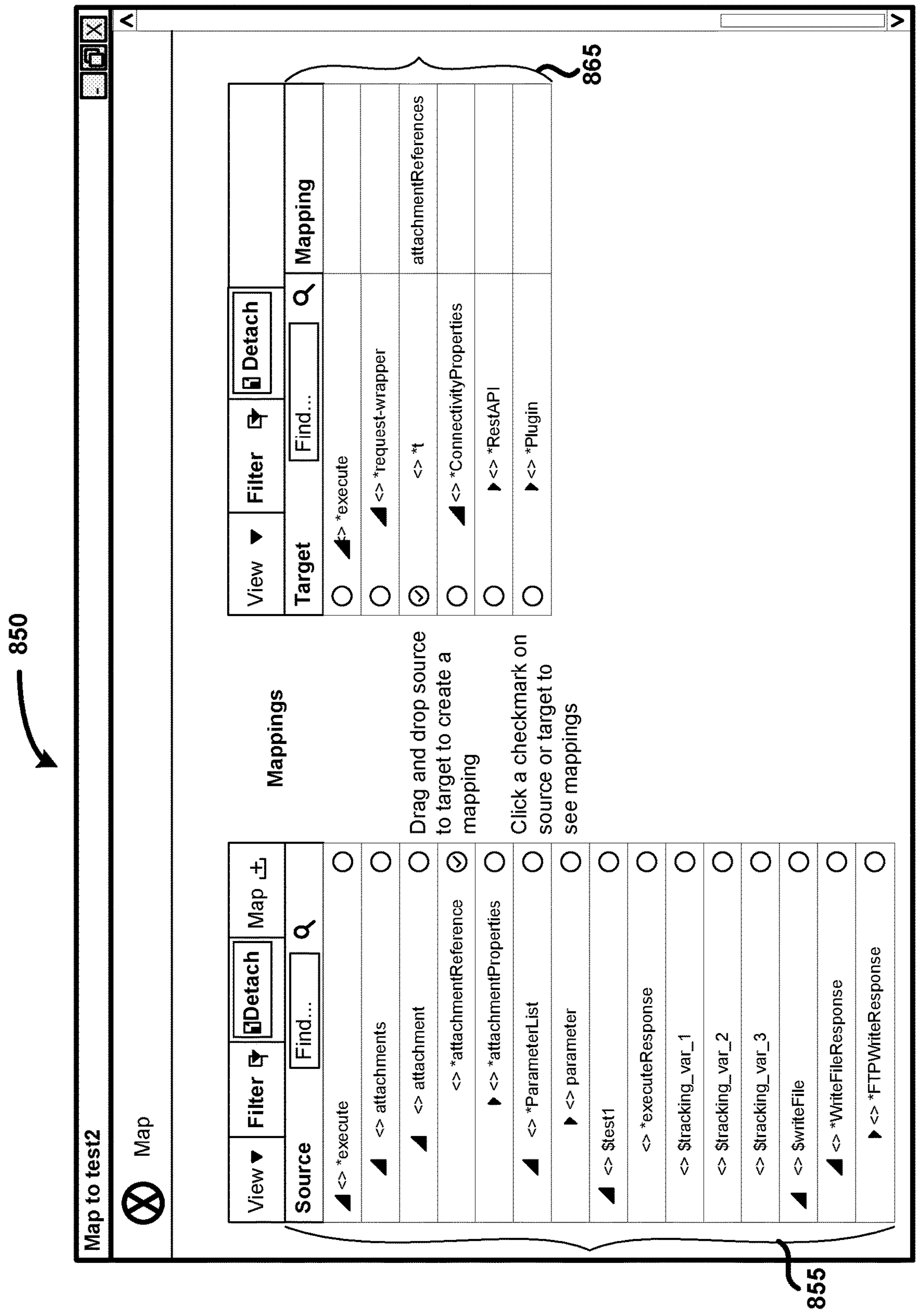

FIG. 8C is a graphical user interface (GUI) 850 that illustrates the mapping of elements at Mapper 205C. As may be observed from FIG. 8C, element 'attachmentReference' from the list of source elements 855 is mapped to element 't' in the list of target elements 865.

In an example embodiment, the mappings specified by the designer through the GUIs is stored in XSLT format, as shown in Appendix-B.

Designer can specify a mapping between a source element and a target element by dragging and dropping the source element opposite to the corresponding target element. However, other techniques as may be apparent to a skilled practitioner may be used to specify a mapping between a source element and a target element. FIGS. 8A-8C also provide for viewing the mappings specified by the designer by clicking on the checkmark opposite to a source element or a target element.

The description is continued with respect to an example embodiment in which the features are operative by execution of appropriately designed executable modules.

9. Digital Processing System

Figure 9:
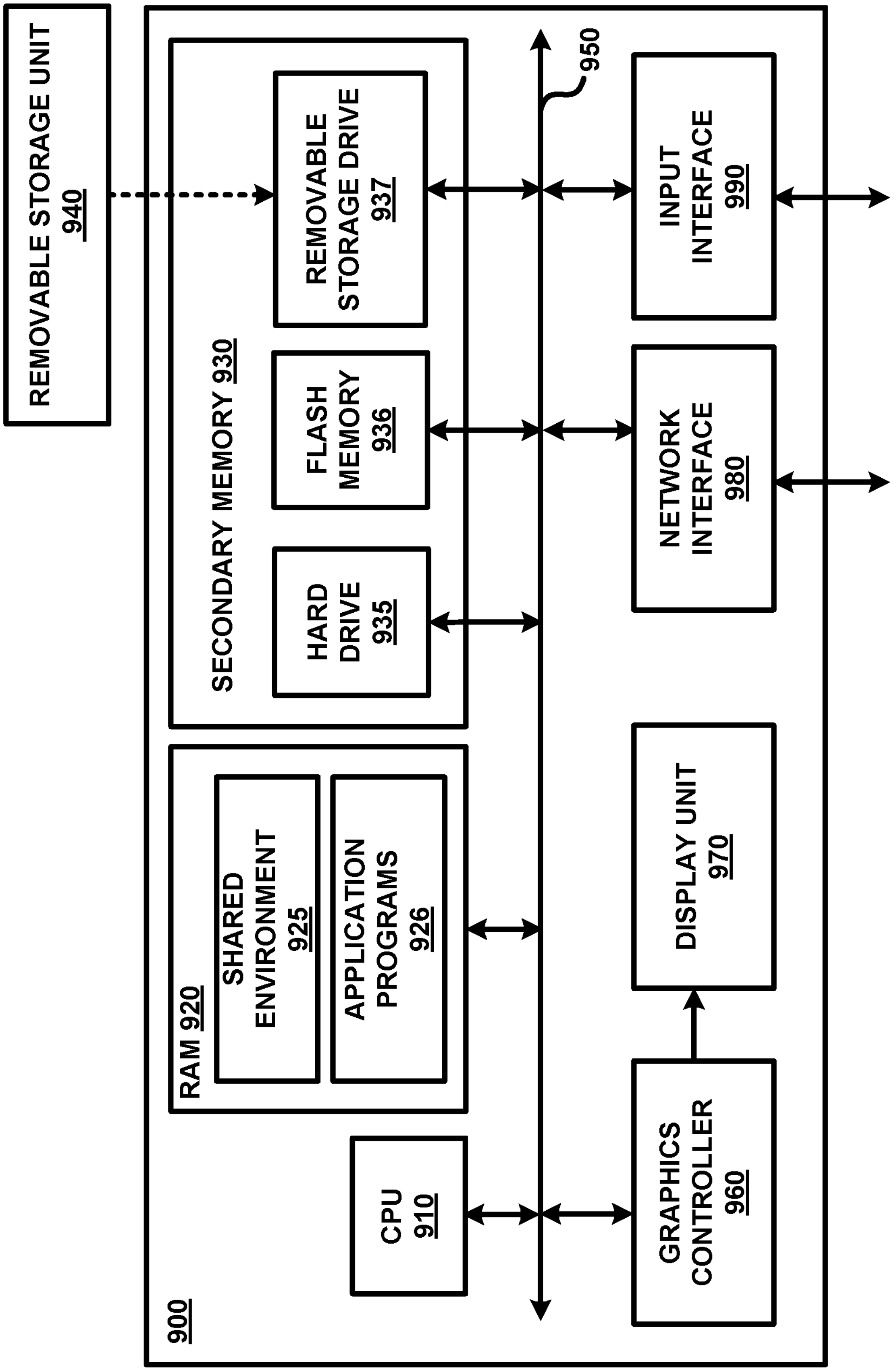
FIG. 9 is a block diagram illustrating the details of digital processing system in which various aspects of the present disclosure are operative by execution of appropriate executable modules.

FIG. 9 is a block diagram illustrating the details of digital processing system 900 in which various aspects of the present disclosure are operative by execution of appropriate executable modules. Digital processing system 900 corresponds to each of application server 710, orchestration system 110, and client system 740 individually.

Digital processing system 900 may contain one or more processors such as a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and application programs 926. Shared environment 925 includes operating systems, device drivers, virtual machines, etc., which provide a (common) run time environment for execution of user programs 926. The various modules described above may be contained in application programs 926 executing in shared environment 925.

Graphics controller 960 generates display signals (e.g., in RGB format) to display unit 970 based on data/instructions received from CPU 910. Display unit 970 contains a display screen to display the images defined by the display signals. Input interface 990 may correspond to a keyboard and a pointing device (e.g., touch-pad, mouse) that may be used to provide appropriate inputs (e.g., for editing the configuration data). Network interface 980 provides connectivity to a network (e.g., using Internet Protocol), and may be used to communicate with the other systems of (of FIG. 7) connected to the network (730). Network interface 980 may also be used to communicate with the cloud infrastructure 150 and database 120 of FIG. 1.

Secondary memory 930 may contain hard drive 935, flash memory 936, and removable storage drive 937. Secondary memory 930 may store the data (for example, portions of the configuration data as appropriate files) and software instructions (for implementing the flowchart of FIG. 3*s*), which enable digital processing system 900 to provide several features in accordance with the present disclosure. The code/instructions stored in secondary memory 930 either may be copied to RAM 920 prior to execution by CPU 910 for higher execution speeds, or may be directly executed by CPU 910.

Some or all of the data and instructions may be provided on removable storage unit 940, and the data and instructions may be read and provided by removable storage drive 937 to CPU 910. Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method of inserting custom activities in orchestrated application suites, the method being performed in a digital processing system, the method comprising:

identifying an element of interest in a base suite, said base suite containing a set of applications which are defined to process a request according to a processing flow;

determining a scope of the element of interest in the base suite, wherein an end of the scope of the element is determined as a last application of the base suite which uses the element of interest in the processing flow; and inserting a custom activity with respect to said element after the last application between two successive applications in the processing flow to form a deployment suite corresponding to the base suite.

2. The method of claim 1, wherein the two successive applications comprise the last application and a second application of the set of applications which immediately follows the last application in the processing flow of the base suite, wherein the inserting comprises placing a custom module between the last application and the second application, wherein the custom module when executed performs the custom activity.

3. The method of claim 2, wherein a first orchestration data specifies an invocation contract at an entry application in the processing flow, wherein the base suite comprises the set of applications and a set of mappers, wherein each mapper of the set of mappers is associated with an immediately following application of the set of applications according to the processing flow, wherein the mapper maps elements of the invocation contract or earlier applications in the processing flow to an input data of the associated application as also specified in the first orchestration data, wherein the determining of the scope comprises examining the first orchestration data to identify a last application in each flow of the processing flow where the element of interest is used.

4. The method of claim 3, wherein the element of interest is a file stored in a secondary storage in accordance with the processing flow, wherein the custom activity comprises removing the file from the secondary storage upon completion of usage of the element in the processing flow.

5. The method of claim 4, wherein the file is identified by an identifier, the identifier being sent from a first system implementing a part of the processing flow, the first identifier being sent from the first system to a second system and thereafter being received from the second system as a part of a stateless architecture.

6. The method of claim 3, wherein the deployment suite and the base suite are designed for operation in a cloud infrastructure.

7. The method of claim 6, wherein the mapping is specified per eXtensible Markup Language (XML).

8. A non-transitory machine readable medium storing one or more sequences of instructions, wherein execution of said one or more instructions by one or more processors contained in a digital processing system causes the digital processing system to perform the actions of:

identifying an element of interest in a base suite, said base suite containing a set of applications which are defined to process a request according to a processing flow;

determining a scope of the element of interest in the base suite, wherein an end of the scope of the element is determined as a last application of the base suite which uses the element of interest in the processing flow; and inserting a custom activity with respect to said element after the last application between two successive applications in the processing flow to form a deployment suite corresponding to the base suite.

9. The non-transitory machine readable medium of claim 8, wherein the two successive applications comprise the last application and a second application of the set of applications which immediately follows the last application in the processing flow of the base suite, wherein the inserting comprises placing a custom module between the last application and the second application, wherein the custom module when executed performs the custom activity.

10. The non-transitory machine readable medium of claim 9, wherein a first orchestration data specifies an invocation contract at an entry application in the processing flow, wherein the base suite comprises the set of applications and a set of mappers, wherein each mapper of the set of mappers is associated with an immediately following application of the set of applications according to the processing flow, wherein the mapper maps elements of the invocation contract or earlier applications in the processing flow to an input data of the associated application as also specified in the first orchestration data, wherein the determining of the scope comprises examining the first orchestration data to identify a last application in each flow of the processing flow where the element of interest is used.

11. The non-transitory machine readable medium of claim 10, wherein the element of interest is a file stored in a secondary storage in accordance with the processing flow, wherein the custom activity comprises removing the file from the secondary storage upon completion of usage of the element in the processing flow.

12. The non-transitory machine readable medium of claim 11, wherein the file is identified by an identifier, the identifier being sent from a first system implementing a part of the processing flow, the first identifier being sent from the first system to a second system and thereafter being received from the second system as a part of a stateless architecture.

13. The non-transitory machine readable medium of claim 10, wherein the deployment suite and the base suite are designed for operation in a cloud infrastructure.

14. The non-transitory machine readable medium of claim 13, wherein the mapping is specified per eXtensible Markup Language (XML).

15. A digital processing system facilitating insertion of custom activities in orchestrated application suites, the digital processing system comprising:

a memory to store instructions;

one or more processors to execute the instructions stored in the memory to cause the digital processing system to perform the actions of:

identifying an element of interest in a base suite, said base suite containing a set of applications which are defined to process a request according to a processing flow;

determining a scope of the element of interest in the base suite, wherein an end of the scope of the element is determined as a last application of the base suite which uses the element of interest in the processing flow; and inserting a custom activity with respect to said element after the last application between two successive applications in the processing flow to form a deployment suite corresponding to the base suite.

16. The digital processing system of claim 15, wherein the two successive applications comprise the last application and a second application of the set of applications which immediately follows the last application in the processing flow of the base suite, wherein the inserting comprises placing a custom module between the last application and the second application, wherein the custom module when executed performs the custom activity.

17. The digital processing system of claim 16, wherein a first orchestration data specifies an invocation contract at an entry application in the processing flow, wherein the base suite comprises the set of applications and a set of mappers, wherein each mapper of the set of mappers is associated with an immediately following application of the set of applications according to the processing flow, wherein the mapper maps elements of the invocation contract or earlier applications in the processing flow to an input data of the associated application as also specified in the first orchestration data, wherein the determining of the scope comprises examining the first orchestration data to identify a last application in each flow of the processing flow where the element of interest is used.

18. The digital processing system of claim 17, wherein the element of interest is a file stored in a secondary storage in accordance with the processing flow, wherein the custom activity comprises removing the file from the secondary storage upon completion of usage of the element in the processing flow.

19. The digital processing system of claim 18, wherein the file is identified by an identifier, the identifier being sent from a first system implementing a part of the processing flow, the first identifier being sent from the first system to a second system and thereafter being received from the second system as a part of a stateless architecture.

20. The digital processing system of claim 17, wherein the deployment suite and the base suite are designed for operation in a cloud infrastructure, wherein the mapping is specified per eXtensible Markup Language (XML).

* * * * *

UNITED STATES PATENT AND TRADEMARK OFFICE
CERTIFICATE OF CORRECTION

PATENT NO. : 10,585,678 B2  
APPLICATION NO. : 15/956777  
DATED : March 10, 2020  
INVENTOR(S) : Devta It is certified that error appears in the above-identified patent and that said Letters Patent is hereby corrected as shown below:

In the Specification

In Column 2, Line 3, delete "FIG." and insert -- FIGS. --, therefor.

In Column 3, Line 67, delete "Google" and insert -- Google™ --, therefor.

Signed and Sealed this
Twenty-seventh Day of October, 2020

Andrei Iancu
*Director of the United States Patent and Trademark Office*